R. M. GRAHAM.
MIXING MACHINE FOR RUBBER.
APPLICATION FILED AUG. 7, 1916.

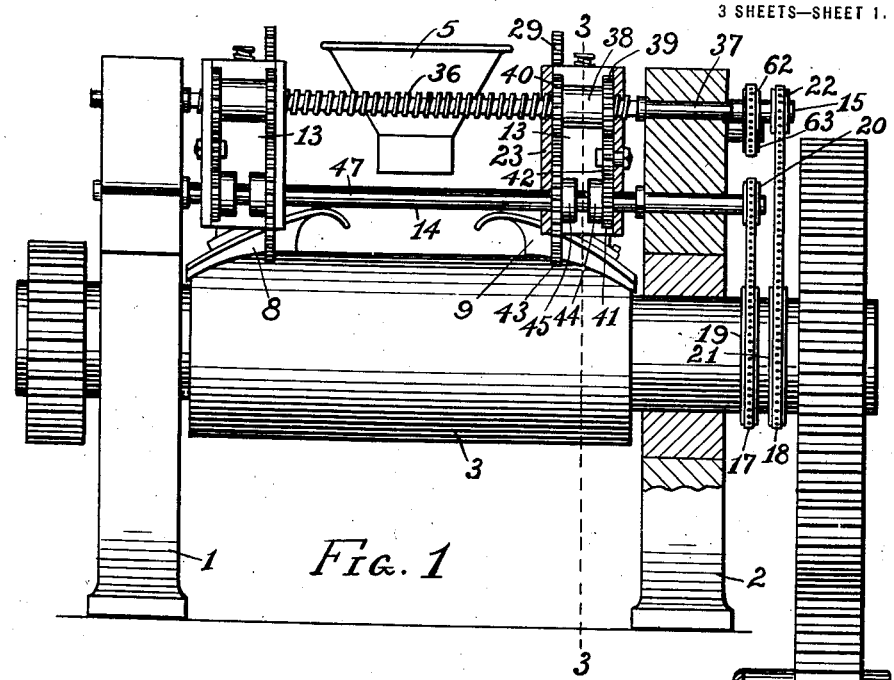

1,220,221.

Patented Mar. 27, 19
3 SHEETS—SHEET 2.

Inventor
R. M. Graham
By [signature]
his Attorney

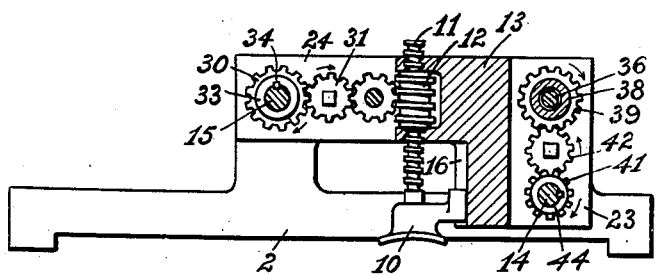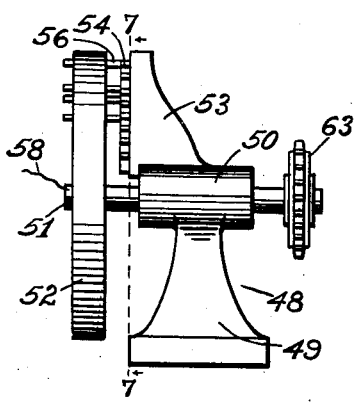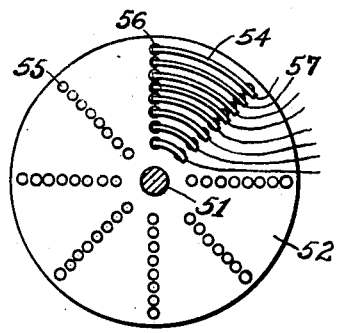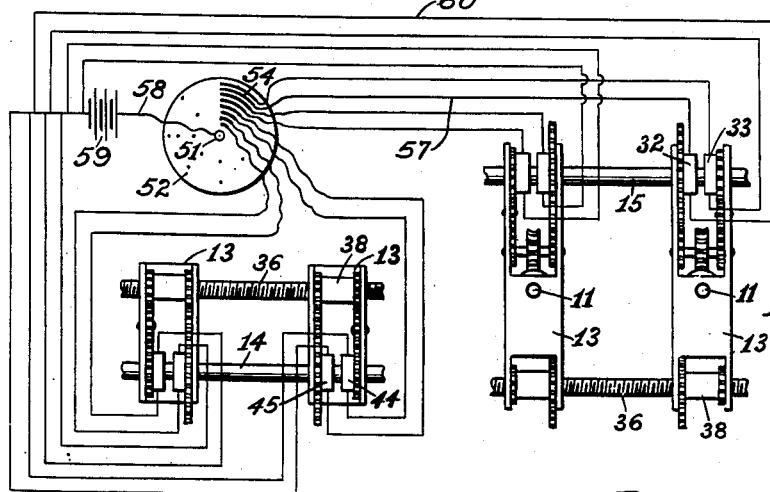

UNITED STATES PATENT OFFICE.

ROBERT M. GRAHAM, OF AKRON, OHIO.

MIXING-MACHINE FOR RUBBER.

1,220,221.   Specification of Letters Patent.   Patented Mar. 27, 1917.

Application filed August 7, 1916. Serial No. 113,436.

*To all whom it may concern:*

Be it known that I, ROBERT M. GRAHAM, a citizen of the United States, residing at Akron, in the county of Summit and State of Ohio, have invented certain new and useful Improvements in Mixing-Machines for Rubber, of which the following is a specification.

This invention relates to a mixing and warming up machine for treating crude rubber, and has for its principal object to provide a machine for automatically mixing, batching out, breaking down or warming up rubber and like substances. This machine has been designed to eliminate the need of manual labor in cutting through and turning over the rubber, which forms in sheets upon the rolls of machines of the above class.

In order that the invention may be clearly understood, the same will be hereinafter fully described in connection with the accompanying drawings, which simply illustrate the invention as applied to a mixing machine, and the novel features thereof will be distinctly pointed out in the appended claims.

In the drawings like characters of reference indicate corresponding parts.

Figure 1 is a front elevation of a mixing machine constructed in accordance with my invention, certain parts being broken away.

Fig. 2 is an end elevation of the machine, the driving gears being removed,

Figure 3:
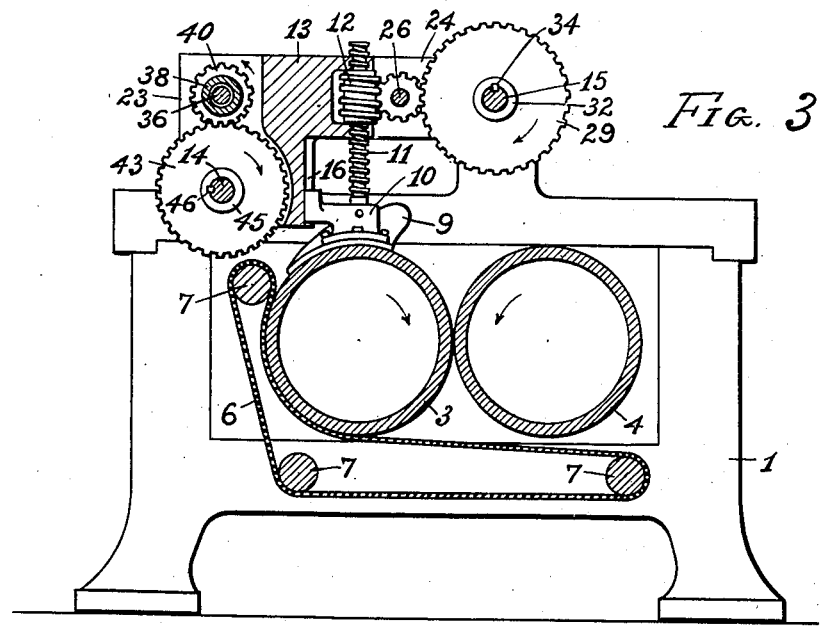
Figure 4:
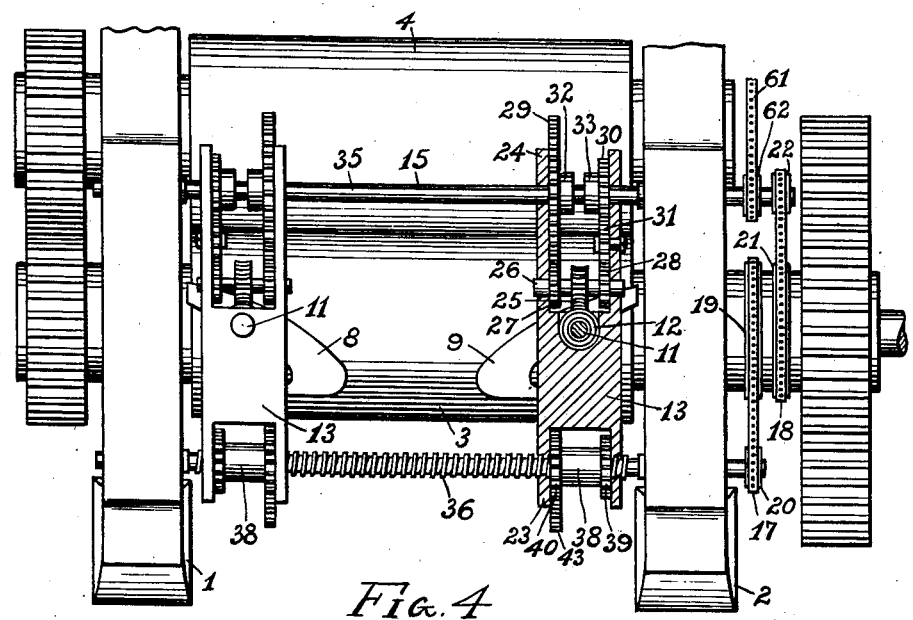

Fig. 3 is a sectional elevation taken on line 3—3 of Fig. 1, looking toward the left, Fig. 4 is a plan view, certain parts being broken away, Fig. 5 is a sectional view of the upper part of the machine taken on line 3—3 of Fig. 1, looking toward the right, Fig. 6 is a side elevation of the electrical clutch controller, Fig. 7 is a view taken on line 7—7 of Fig. 6, and Fig. 8 is a diagrammatical view showing an elevation of the carriages at the left, and plan of same at the right, together with the controller and electric circuits for the clutches.

The drawings are intended to illustrate a construction capable of producing the desired results, and it will be understood that the various parts of the machine are suitably insulated to give the proper electrical circuits for controlling the movements thereof, although the insulations are not shown in the drawings. It will also be understood that slight changes in the construction and arrangement of the parts for carrying out the invention may be made within the scope of the claims.

Referring to the drawings, 1 and 2 represent a pair of side frames supporting a pair of rolls 3 and 4, which are driven in the ordinary manner by a system of gears as shown. A hopper 5 is arranged above the rolls for holding the compounding ingredients of a rubber composition and for feeding the same to the crude rubber being treated by said rolls. An endless apron 6, supported by rollers 7, is rotated by frictional contact with the roll 3 and is adapted to catch the particles of material falling below the rolls and carry the same back to be again passed through the rolls. While the rubber mass is being treated by said rolls, it clings to the rolls and forms a sleeve thereon. It is necessary to cut the rubber from the rolls and turn it over, so that by continuous turning over, mixing with the compounding ingredients, and repeated passing between the rolls, it becomes a thoroughly homogeneous mixture. The purpose of this invention is to accomplish the cutting of the rubber from the rolls and the turning over of the same without the employment of manual labor. This mechanism will now be described.

Arranged above the roll 3 are a pair of suitable blades 8 and 9, which are adapted to move vertically, and also to travel laterally toward the transverse center of the roll and back again for carrying out said cutting and turning over of the rubber mass forming a sleeve upon the roll. Each of said blades is connected to a head 10, which is fixed to a screw 11 mounted in a worm 12 for obtaining said vertical movement of the blades. Each worm is carried by a carriage 13, which is slidably supported upon a pair of shafts 14 and 15 rotatably mounted in the side frames 1 and 2. The head 10 slides vertically in a guide 16 of the carriage for steadying the blade. Said shafts are rotated from the roll 3, to impart lateral movement to said carriages carrying the blades, by means of sprocket chains 17 and 18 passing over the sprocket-wheels 19—20, and 21—22 respectively.

Each carriage is cut out at its forward end, thereby leaving the sides 23, through which the shaft 14 passes, and also at its rear end, leaving the sides 24, through which the shaft 15 passes. The worm 12 is rotated to transmit vertical movement to the screw 11 for lowering or raising the blade carried thereby, by means of a worm wheel 25 fixed to a spindle 26, which is rotatably mounted in the sides 24 of the carriage. On the spindle 26 are fixed a pair of pinions 27 and 28, the former of which is adapted to be rotated by a toothed-wheel 29 carried by the shaft 15, and the other pinion by a gear 30 on said shaft, which gear drives an idler 31 meshing with said pinion. The toothed-wheel 29 and the gear 30 are loosely mounted upon the shaft 15, and are driven thereby by means of clutches 32 and 33, which are feather keyed to the shaft as shown at 34. Said shaft is provided with a longitudinal key-way 35 to permit sliding movement of said clutches with the lateral movement of the carriage. It will be noted that the shaft 15 is always rotating in the same direction, and that the toothed-wheel 29 will cause the blade to move downwardly, whereas by introducing the idler 31, the pinion 28 will be rotated in the reverse direction and the blade raised.

Lateral movement of each carriage 13 is obtained by employing a stationary threaded shaft 36, having its ends 37 fixed in the side frames 1 and 2. This threaded shaft passes through the sides 23 of the carriage, and mounted thereon between said sides is a nut 38, to which are fixed a pair of pinions 39 and 40. The nut 38 is rotated from the shaft 14 by a gear 41 carried thereby, which gear drives an idler 42 in mesh with the pinion 39, to cause the carriage to travel toward the center of the machine. The carriage is moved in the opposite direction by a toothed-wheel 43 on the shaft 14 rotating the pinion 40. As in the case of the toothed-wheel 29 and the gear 30, the toothed-wheel 43 and the gear 41 are loosely mounted upon the shaft 14, and are connected thereto by means of clutches 44 and 45, these clutches being feather keyed to the shaft as shown at 46, and a key-way 47 being provided in the shaft to allow for the lateral movement of the carriage.

In order to actuate the clutches 32 and 33 to cause vertical movement of the blades, or the clutches 44 and 45 to cause lateral movement of the carriages, any suitable means may be employed. It is intended that these clutches be operated automatically for controlling the movements of the machine. As illustrated in the drawings, these clutches are of the electrical type and are operated by means of a controller 48. This controller consists of a stand 49 having a bearing 50 for supporting a shaft 51, which carries at one end a disk 52. Projecting from the stand 49 is a bracket 53, to which are fastened a plurality of concentric brushes 54, the number corresponding to the number of clutches. The disk 52 is provided with perforations 55 arranged on the arc of circles corresponding to the concentric brushes 54. Contact pins 56 are fixed in said perforations for engaging said brushes and are arranged at such intervals as to make and break an electrical circuit for actuating the clutches to properly control the movement of the blades. Each of said clutches is connected by a circuit wire, indicated by 57, to one of the brushes 54. A wire 58 extends from the controller shaft 51 to a source of electrical current, as the battery 59, and the battery is connected to each of said clutches by means of wires designated by 60. The controller is bolted to the side of the machine, and is preferably driven from the shaft 15 by means of a sprocket chain 61, which connects a sprocket-wheel 62 thereon to a sprocket-wheel 63 on the shaft of the controller.

Operation: It will be assumed that the contact pins 56 have been arranged in the perforations 55 in the proper positions for making closed circuits with the brushes 54 the necessary length of time to control the action of the clutches and thereby the movement of the blades. Each blade is moved independently toward or away from the roll, or carried toward the transverse center thereof or back again, or both blades may be moved at the same time, according to the setting of said contact pins.

In practice, the roll 3 is driven in the direction shown by the arrow and the roll 4 rotates in the opposite direction. The shaft 15, being driven from the roll 3 by means of the sprocket chain 18, revolves in the same direction. The controller in turn is driven from the shaft 15 by the sprocket chain 61. By the rotation of the disk 52 of the controller, the contact pins 56 carried thereby engage their brushes 54 and the different electric circuits such as 57, 58, 59 and 60 are completed. The closing of said circuits causes the clutches therein to act. For instance, the clutch 33 will cause the shaft 15 to drive the gear 30, which will rotate the idler 31, which in turn drives the pinion 28. This rotates the worm wheel 25 in mesh with the worm 12, thereby forcing the blade downwardly to cut through the rubber sleeve formed upon the roll. The clutch 44 then causes the shaft 14 to drive the gear 40, the idler 42 and pinion 39, which rotates the nut 38 on the threaded shaft 36. This causes the carriage to travel toward the transverse center of the roll, thus carrying the blade along the roll for turning over the rubber. As soon as the blade reaches its central position, the other clutch 32 on the shaft 15 causes the toothed wheel 29 to rotate the pinion 27, which turns the worm wheel 12, thereby raising the blade. Then the other clutch 45 on the shaft 14 causes the toothed wheel 43 to drive the pinion 40, which rotates the nut 38, and causes the carriage to travel back to its original position. From the foregoing, it will be understood that each blade may be controlled by suitable arrangement of the contact pins to move independently, or both may be moved at the same time, either toward or away from the roll or caused to travel toward the transverse center of the roll and back again.

Having fully described my invention, what I claim is:

1. In a mixing machine, the combination of a roll, means for rotating the roll, a blade, and means actuated from the rotation of the roll for moving the blade vertically, substantially as described.

2. In a mixing machine, the combination of a roll, means for rotating the roll, a blade, means actuated from the rotation of the roll for moving the blade toward and away from the roll, and means actuated from the rotation of the roll for moving the blade laterally, substantially as described.

3. In a mixing machine, the combination of a roll, means for rotating the roll, a blade, means actuated from the rotation of the roll for moving the blade toward and away from the roll, and means actuated from the rotation of the roll for moving the blade toward the transverse center of the roll and back again, substantially as described.

4. In a mixing machine, the combination of a pair of rolls, means for rotating the rolls, a pair of blades, means actuated from one of the rolls for moving each of said blades toward and away from said roll, means actuated from said roll for moving each of said blades toward the transverse center of said roll and back again, and means actuated from said roll for moving both of said blades at the same time toward the transverse center of said roll and back again, substantially as described.

5. In a mixing machine, the combination of a pair of rolls, means for rotating the rolls, a pair of blades, carriages supporting the blades, means actuated from the rolls for moving said blades vertically, and means actuated from the rolls for moving said carriages laterally, substantially as described.

6. In a mixing machine, the combination of a pair of rolls, means for rotating the rolls, a pair of blades, carriages, the blades being supported by the carriages and adapted to move vertically, means actuated from the rolls for moving the blades, and means actuated from the rolls for moving the carriages laterally, substantially as described.

7. In a mixing machine, the combination of a pair of rolls, means for rotating the rolls, a pair of blades, carriages, the blades being fixed to screws, means carried by the carriages for coöperating with the screws to move the blades vertically, said means being operated from the rolls, and means actuated from the rolls for moving said carriages laterally, substantially as described.

8. In a mixing machine, the combination of a pair of rolls, means for rotating the rolls, a pair of blades, carriages, the blades being fixed to screws, worms carried by the carriages and receiving said screws, means carried by the carriages for rotating said worms, said means being operated from the rolls, and means actuated from the rolls for moving said carriages laterally, substantially as described.

9. In a mixing machine, the combination of a frame, a pair of rolls supported by the frame, means for rotating the rolls, a pair of blades, the blades being fixed to screws, carriages, worms carried by the carriages and receiving the screws, a shaft rotatably mounted in the frame, means for rotating the shaft from the rolls, means carried by the carriages, and actuated from said shaft for coöperating with said worms to move the blades vertically, and means actuated from the rolls for moving said carriages laterally, substantially as described.

10. In a mixing machine, the combination of a frame, a pair of rolls supported by the frame, means for rotating the rolls, a pair of blades, the blades being fixed to screws, carriages, worms carried by the carriages and receiving the screws, a shaft rotatably mounted in the frame, means for rotating the shaft from the rolls, worm wheels carried by the carriages and engaging said worms, means coöperating with the worm wheels, said last means being operated from said shaft, and means actuated from the rolls for moving said carriages laterally, substantially as described.

11. In a mixing machine, the combination of a frame, a pair of rolls supported by the frame, means for rotating the rolls, a pair of blades, the blades being fixed to screws, carriages, worms carried by the carriages and receiving the screws, a shaft rotatably mounted in the frame, means for rotating the shaft from the rolls, worm wheels carried by the carriages and engaging said worms, toothed wheels driven by said shaft for rotating said worm wheels in one direction, gears and idlers driven by said shaft for rotating said worm wheels in the other direction, and means actuated from the rolls for moving said carriages laterally, substantially as described.

12. In a mixing machine, the combination of a frame, a pair of rolls supported by the frame, means for rotating the rolls, a pair of blades, the blades being fixed to screws, carriages, worms carried by the carriages and receiving the screws, a shaft rotatably mounted in the frame, means for rotating the shaft from the rolls, spindles carried by the carriages, worm wheels fixed to the spindles and engaging said worms, a pair of pinions fixed to each of said spindles, toothed wheels loose on said shaft and engaging one of said pair of pinions, means for causing the shaft to drive said toothed wheels, idlers engaging the other of said pinions, gears loose on said shaft and engaging the idlers, means for causing the shaft to drive said idlers, and means actuated from the rolls for moving said carriages laterally, substantially as described.

13. In a mixing machine, the combination of a frame, a pair of rolls supported by the frame, means for rotating the rolls, a pair of blades, carriages, the blades being supported by the carriages and adapted to move vertically, means actuated from the rolls for moving the blades, a shaft rotatably mounted in the frame, means for rotating the shaft from the rolls, a threaded shaft, nuts on the threaded shaft for transmitting lateral movement to the carriages, means coöperating with said nuts for rotating them and said last means being operated from said first shaft, substantially as described.

14. In a mixing machine, the combination of a frame, a pair of rolls supported by the frame, means for rotating the rolls, a pair of blades, carriages, the blades being supported by the carriages and adapted to move vertically, means actuated from the rolls for moving the blades, a shaft rotatably mounted in the frame, means for rotating the shaft from the rolls, a threaded shaft, nuts on the threaded shaft for transmitting lateral movement to the carriages, a pair of pinions fixed to each of said nuts, toothed wheels loose on said first shaft and engaging one of said pair of pinions, means for causing the first shaft to drive said toothed wheels, idlers engaging the other of said pinions, gears loose on said first shaft and engaging the idlers, and means for causing the first shaft to drive said idlers, substantially as described.

15. In a mixing machine, the combination of a frame, a pair of rolls supported by the frame, means for rotating the rolls, a pair of blades, the blades being fixed to screws, carriages, worms carried by the carriages and receiving the screws, a shaft rotatably mounted in the frame, means for rotating the shaft from the rolls, spindles carried by the carriages, worm wheels fixed to the spindles and engaging said worms, a pair of pinions fixed to each of said spindles, toothed wheels loose on said shaft and engaging one of said pair of pinions, clutches for causing the shaft to drive the toothed wheels, idlers engaging the other of said pinions, gears loose on said shaft and engaging the idlers, clutches for causing the shaft to drive said gears, means for controlling said clutches, and means actuated from the rolls for moving said carriages laterally, substantially as described.

16. In a mixing machine, the combination of a frame, a pair of rolls supported by the frame, means for rotating the rolls, a pair of blades, carriages, the blades being supported by the carriages and adapted to move vertically, means actuated from the rolls for moving the blades, a shaft rotatably mounted in the frame, means for rotating the shaft from the rolls, a threaded shaft, nuts on the threaded shaft for transmitting lateral movement to the carriages, a pair of pinions fixed to each of said nuts, toothed wheels loose on said first shaft and engaging one of said pair of pinions, clutches for causing the first shaft to drive the toothed wheels, idlers engaging the other of said pinions, gears loose on said first shaft and engaging the idlers, clutches for causing the first shaft to drive said gears, and means for controlling said clutches, substantially as described.

17. In a mixing machine, the combination of a frame, a pair of rolls supported by the frame, means for rotating the rolls, a pair of blades, the blades being fixed to screws, worms for receiving the screws, a shaft rotatably mounted in the frame, means for rotating the shaft from the rolls, worm wheels for engaging said worms, means adapted to be driven from said shaft for rotating the worm wheels, clutches for causing said shaft to drive said last means, and means for controlling the action of the clutches, substantially as described.

18. In a mixing machine, the combination of a frame, a pair of rolls supported by the frame, means for rotating the rolls, a pair of blades, the blades being fixed to screws, carriages, worms carried by the carriages and receiving the screws, a shaft rotatably mounted in the frame, means for rotating the shaft from the rolls, worm wheels carried by the carriages and engaging said worms, means adapted to be driven from said shaft for rotating the worm wheels, clutches for causing said shaft to drive said last means, a threaded shaft, means coöperating with the threaded shaft for moving the carriages laterally, clutches for actuating said last means, and means for controlling the action of said clutches, substantially as described.

19. In a mixing machine, the combination of a frame, a pair of rolls supported by the frame, means for rotating the rolls, a pair of blades, the blades being fixed to screws, carriages, worms carried by the carriages and receiving the screws, a shaft rotatably mounted in the frame, means for rotating the shaft from the rolls, worm wheels carried by the carriages and engaging said worms, means adapted to be driven from said shaft for rotating the worm wheels, electrical clutches for causing said shaft to drive said last means, a threaded shaft, means coöperating with the threaded shaft for moving the carriages laterally, electrical clutches for actuating said last means, a controller, the controller consisting of a rotatably mounted disk, the disk being driven from said shaft, brushes, the disk and brushes being arranged in an electric circuit, and the disk carrying contact pins adapted to engage said brushes for closing the circuit to actuate said clutches, substantially as described.

In testimony whereof I affix my signature.

ROBERT M. GRAHAM.